(12) United States Patent
Viera et al.

(10) Patent No.: US 8,660,952 B1
(45) Date of Patent: Feb. 25, 2014

(54) SYSTEM AND METHOD FOR IMPROVED REMOTE DEPOSIT USER SUPPORT

(71) Applicant: Ensenta Inc., Redwood Shores, CA (US)

(72) Inventors: Edward Viera, Redwood City, CA (US); Richard Klein, Lafayette, CA (US); Jim Ballagh, Long Beach, CA (US); Teddy Usman, San Francisco, CA (US); Dmitri Boudtchenko, Palo Alto, CA (US); Crystal Carroll, San Leandro, CA (US); Paulo dos Santos, Mountain View, CA (US); Rajini Jagathesan, Milpitas, CA (US); Chaitanya Mittipelli, Fremont, CA (US); Nhan Phan, Union City, CA (US); Sharmila Pusarla, San Jose, CA (US)

(73) Assignee: Ensenta, Inc., Redwood Shores, CA (US)

( * ) Notice: Subject to any disclaimer, the term of this patent is extended or adjusted under 35 U.S.C. 154(b) by 0 days.

(21) Appl. No.: 13/658,624

(22) Filed: Oct. 23, 2012

(51) Int. Cl.
*G06Q 10/00* (2012.01)
*G06Q 40/00* (2012.01)

(52) U.S. Cl.
USPC .............................. 705/42; 705/1.1; 705/35

(58) Field of Classification Search
USPC .................................................... 705/1.1, 35
See application file for complete search history.

(56) References Cited

U.S. PATENT DOCUMENTS

| | | | | |
|---|---|---|---|---|
| 7,392,935 | B2* | 7/2008 | Byrne et al. | 235/379 |
| 7,971,059 | B2* | 6/2011 | Calman et al. | 713/168 |
| 8,538,124 | B1* | 9/2013 | Harpel et al. | 382/137 |
| 2004/0210515 | A1* | 10/2004 | Hughes | 705/39 |
| 2006/0293989 | A1* | 12/2006 | Morrison et al. | 705/35 |
| 2012/0226609 | A1* | 9/2012 | Ebbert et al. | 705/42 |
| 2013/0085935 | A1* | 4/2013 | Nepomniachtchi et al. | 705/40 |

\* cited by examiner

*Primary Examiner* — William Rankins
(74) *Attorney, Agent, or Firm* — Fountainhead Law Group P.C.

(57) ABSTRACT

Systems and methods for improved remote deposit support and troubleshooting are disclose. In remote deposit sessions, such as a remote check deposit transaction that uses images of the front and back of a check, various errors, conflicts and issues can occur with each step of the session. Embodiments of the present invention can include generating a unique identifier for a particular remote deposit session at or before a particular session or transaction begins and then create a record for each event or task of that session and associate it with the identifier. During a support or troubleshooting session, all transactions can records associated with a particular identifier can be retrieved from a data store and displayed to a user. Such a display can include a listing of various detailed specifics for each record and embedded controls to various tools for detecting, diagnosing, and correcting errors.

20 Claims, 7 Drawing Sheets

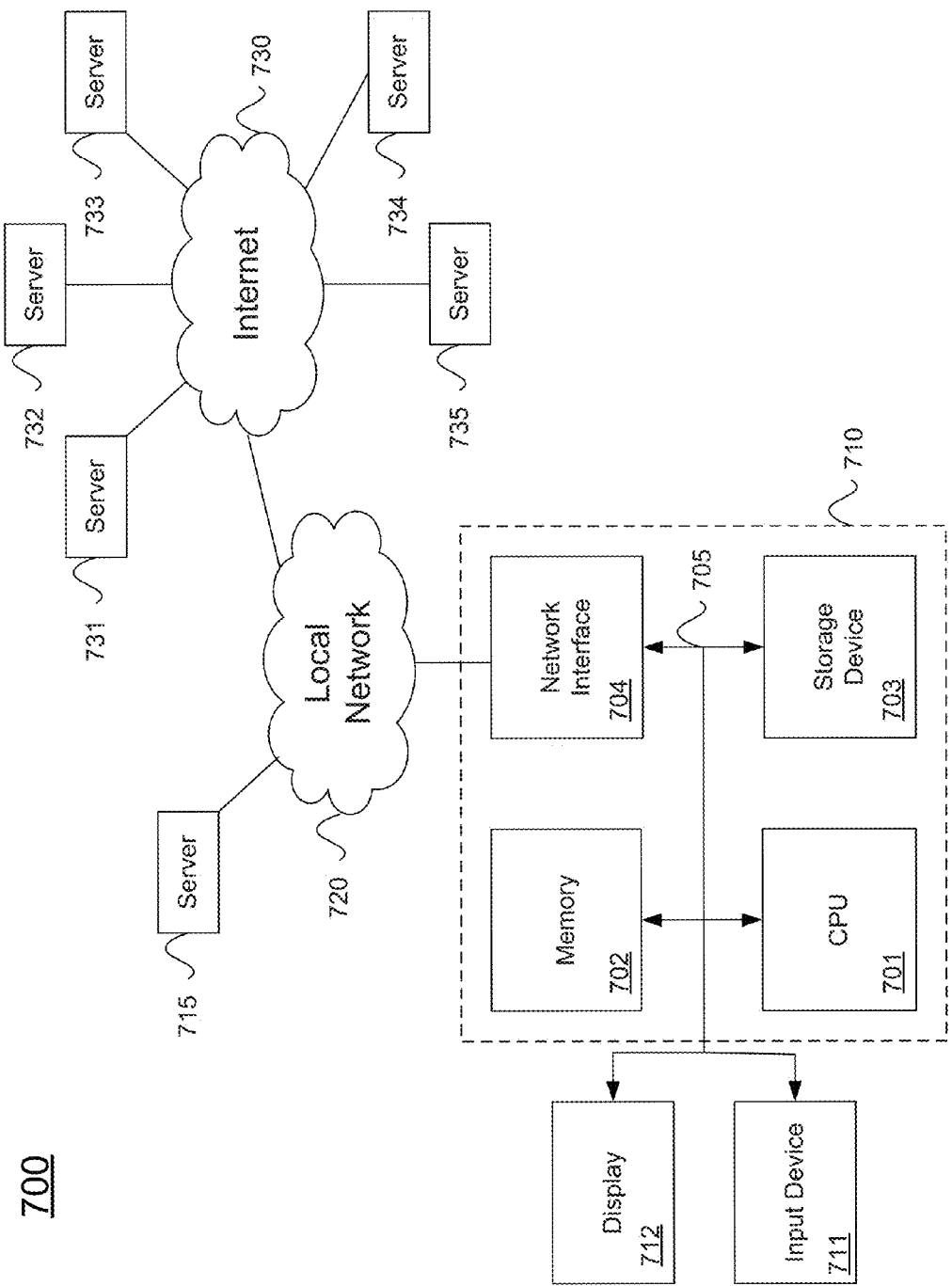

SYSTEM AND METHOD FOR IMPROVED REMOTE DEPOSIT USER SUPPORT

CROSS REFERENCE TO RELATED APPLICATIONS

Not Applicable

BACKGROUND

The present invention relates to systems and methods for recording and displaying detailed remote deposit session data to a user during an on-line or in-process troubleshooting sessions to provide improved remote deposit user support. User support can be provided to end users, such as bank account holders, or to the banks and other financial institutions that service such account holders.

Unless otherwise indicated herein, the approaches described in this section are not prior art to the claims in this application and are not admitted to be prior art by inclusion in this section.

To increase the convenience and speed of using existing and legacy checking systems and checks, many banks and other service providers have implemented various types of remote deposit systems. In such systems, a user can associate a deposit or checking account with a particular remote deposit system. That user can then deposit checks or other physical deposit documents into the associated account without taking or sending the physical document to the financial institution that services the account. Instead of taking the deposit document or sending the deposit document to the physical location of the bank or other financial institution servicing the account, a user need only image the front and back of the deposit document written to the user or the user's business. Such images of the front and back of the deposit documents are typically captured in a digital format using a scanner or digital camera. The user, or a system or device controlled by the user, can send the digital images of the deposit document directly to a remote deposit processor, or an intermediate entity, via one or more electronic communication media, i.e. the Internet, for processing.

When the remote deposit processor, or other financial transaction processor, such as financial transaction network, receives the images of the deposit document it typically performs various types of image analysis and data processing. For example, to extract any information from the digital image of the deposit document, most systems first perform optical character recognition (OCR) on the deposit document. The OCR converts the data embedded in the image of the deposit document into ASCII or binary code that can be read by a computer system. Typical OCR processes extract the name of the payee, the amount of the payments, the account and routing number information, the date, and any other information that might be printed or written on the front or back of the deposit document. Some remote deposit systems use the same OCR process to detect a signature, while others use a separate module or service to determine whether or not there is a semblance of a valid signature.

Because such remote deposit systems rely heavily, if not solely, on the information they can decipher from the digital image of a deposit document, it is important that the image of the deposit document be in focus and have sufficient resolution and contrast that the information can be accurately determined. Additionally, it is important that information regarding how, where, and by whom, the image of the deposit document was captured. However, due to the myriad ways that a user can capture a digital image of a deposit document, i.e. digital camera, scanner, camera phone, etc., the size, resolution, alignment, and quality of the various deposit document received from various users can vary dramatically. For instance, the quality of a deposit document image captured by a desktop computer using a scanner and a client-based image capture program can be greater than that of a deposit document image captured by a mobile computing device with a miniaturized camera module running a standalone or Web-enabled application.

Even in situations where the deposit document is legitimate, and includes all the requisite information, including a signature, various image quality issues can cause errors in the recognition process that would prevent typical remote deposit systems from deciphering or validating the necessary information from image of the deposit document. In some remote deposit systems, a color or grayscale image of the deposit document, due to regulatory or system requirements, is converted into a bi-tonal, i.e. black and white, digital image to increase the contrast, and to reduce the file size of the image of the deposit document to be stored and sent to other agencies or regulators. When the digital image of the deposit document is converted to a bi-tonal image, some or all the information can be lost. This is particularly problematic in digital images of deposit documents that have low contrast or low-resolution.

When a digital image of a deposit document is received in, or processed into, such a condition that it cannot be deciphered or validated, i.e. the account or routing number is not legible, or a signature cannot be detected, typical remote deposit systems will reject the deposit. Additionally, various technical issues can arise based on incompatibilities between various operating systems of a computing device, the software used to capture the deposit document image, and applications and software run on a remote server computer used to interpret or decipher remote deposit session information. Most banks will reject the deposit because the omission of necessary information from the digital image or other user submitted data can not only prevent the remote deposit system from properly processing or handling the deposit, such data can also be or include an indication that the deposit document is fraudulent.

A rejection of the deposit causes the deposit document to be returned. A returned deposit document can cause many undesirable consequences. For example, the amount of the deposit document written to the payee will not be deposited into the payee's account. In the case that the deposit is already made to the payee account, the payer's bank and the payee's bank must coordinate to transfer the deposit out of the payee's account back to the payer's account. Not only do such procedures cause delays, they can also cost the payee and the payer and their associated banks money. For example, the person who wrote a check, depending on the type checking account they have, may be assessed a fee for the returned check.

Additionally, a failure of a remote deposit system can lead to end-user and financial institution dissatisfaction and mistrust of the remote deposit system, such that the user or financial institution will be hesitant to use such a remote deposit system. Furthermore, in the event of a remote deposit session error users and financial institutions expect timely and efficient resolution when an issue or troubleshooting ticket is created. Typical remote deposit troubleshooting systems currently do not include a centralized fast and efficient troubleshooting user interface that can be accessed by an operator of the remote deposit system, a user of remote deposit system, or a financial institution that subscribes or supports the remote deposit system. If users and financial institutions are hesitant to use a remote deposit system, due to inconvenience, wasted time, and extra expense, then there is little chance that such a remote deposit system will be successful in the marketplace.

Thus, there is a need for improved handling of issues and exceptions caused by poor quality image capture for image processing and other technical errors caused by the various components of a remote deposit system. The present invention solves these and other problems by providing systems and methods for improved remote deposit related user support, troubleshooting, and administration.

SUMMARY

Embodiments of the present invention include improved systems and methods for remote deposit support and troubleshooting. In one embodiment, the present invention includes a method that includes receiving, in a computer system, user input comprising a remote deposit session identifier associated with a particular remote deposit session, and in response retrieving remote deposit session data associated with the remote deposit session identifier from a remote deposit event data store. The remote deposit session data can include a plurality of remote deposit event records having a first remote deposit event record created first in time before the other remote deposit event records. Such embodiments can also include displaying, on a display device of the computer system, the remote deposit event records. Each remote deposit event record can correspond to a particular event of the remote deposit session and comprises a plurality of attributes associated with the particular event. In such embodiments, the remote deposit session identifier can include an identifier created before the first remote deposit event record.

In some embodiments, receiving user input occurs during a user support or troubleshooting session already in progress. In related embodiments, the remote deposit session can include a remote check deposit transaction using an image of a check.

In yet other embodiments, each of the plurality of remote deposit event records is associated with a time identifier. In related embodiments, the time identifier comprises a duration corresponding to a difference between a start time and an end time of a particular remote deposit event.

Various other embodiments of the present invention include systems that can include a deposit image information processor and a network interface coupled to the deposit image information processor and an external network and a deposit processor. In such embodiments, the deposit image information processor can receive user input that includes a remote deposit session identifier associated with a particular remote deposit session. In response to the remote deposit session identifier, the deposit image information processor can retrieve, through the network interface remote deposit session data associated with the remote deposit session identifier from a remote deposit event data store. Such remote deposit session data can include a plurality of remote deposit event records having a first remote deposit event record created first in time before the other remote deposit event records. In some embodiments, the deposit image information processor can display the remote deposit event records. Each of such remote deposit event records corresponds to a particular event of the remote deposit session and includes a plurality of attributes associated with the particular event. In such embodiments, the remote deposit session identifier can include an identifier created before the first remote deposit event record.

In some embodiments, the deposit image information processor can receive user input during a user support or troubleshooting session already in progress. In related embodiments, the remote deposit session can include a remote check deposit transaction using an image of a check.

In yet other embodiments, each of the plurality of remote deposit event records is associated with a time identifier. In related embodiments, the time identifier comprises a duration corresponding to a difference between a start time and an end time of a particular remote deposit event.

Various other embodiment include non-transitory storage media that include executable code representing or including instructions that when executed causes a processor to receive user input comprising a remote deposit session identifier associated with a particular remote deposit session, retrieve, through a network interface, remote deposit session data associated with the remote deposit session identifier from a remote deposit event data store, each said remote deposit session data comprises a plurality of remote deposit event records having a first remote deposit event record created first in time before the other remote deposit event records, and display the remote deposit event records, each said remote deposit record corresponds to a particular event of the remote deposit session and comprises a plurality of attributes associated with the particular event. Such remote deposit session identifier can include an identifier created before the first remote deposit event record.

In some embodiments, the executable code can further include instructions that cause the processor to receive user input during a user support or troubleshooting session already in progress. In related embodiments, the remote deposit session can include a remote check deposit transaction using an image of a check.

In yet other embodiments, each of the plurality of remote deposit event records can be associated with a time identifier. In related embodiments, the time identifier can include a duration corresponding to a difference between a start time and an end time of a particular remote deposit event.

In some embodiments, at least one of the attributes of a remote deposit event record can include an embedded control. The embedded control can include a link to a deposit document viewer.

The following detailed description and accompanying drawings provide a better understanding of the nature and advantages of the present invention.

BRIEF DESCRIPTION OF THE DRAWINGS

FIG. 7 illustrates a simplified schematic of a computer system that can be used to implement various embodiments of the present invention.

DETAILED DESCRIPTION

Figure 1A:
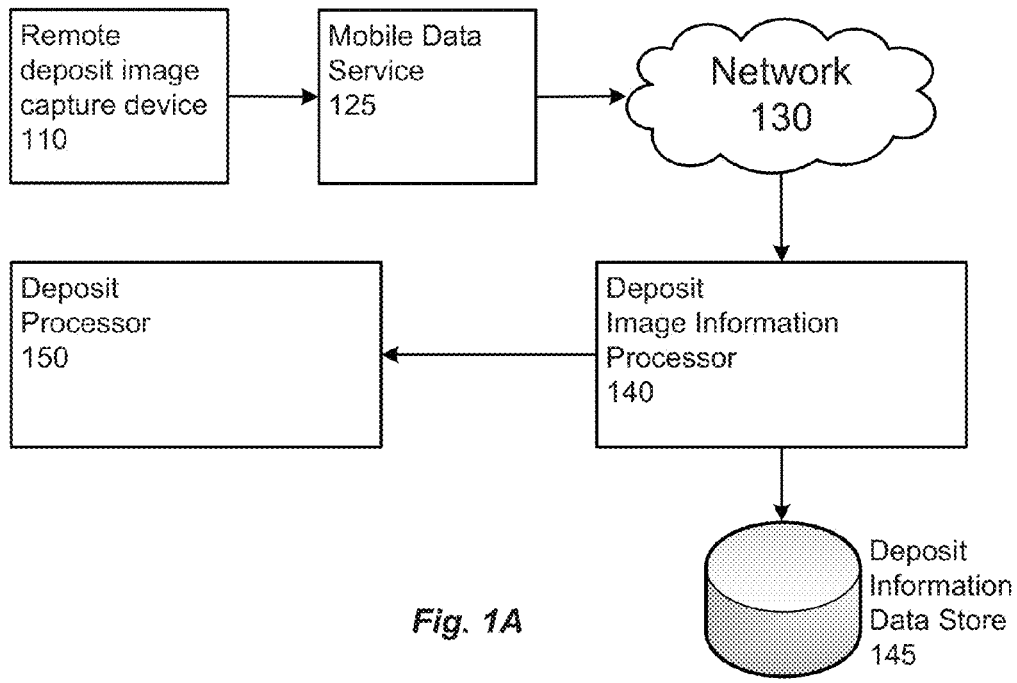
FIGS. 1A and 1B illustrates simplified schematic of a system for improved remote deposit support and troubleshooting, according to one embodiment of the present invention.

Described herein are techniques for systems and methods for improved remote deposit user support and troubleshooting. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various embodiments of the present invention include systems and methods for on-line, in-process, or off-line user support and remote deposit session troubleshooting. In such embodiments, the remote user can initiate a remote deposit session by sending one or more electronic messages to a remote deposit processor, such as a bank or other financial institution. The electronic messages can include digital images of a deposit document, such as a check, as well as other user supplied information, required by the remote deposit session for initiating, processing, and executing a remote deposit procedure which ultimately ends in the deposit of funds in a financial account associated with the user. The user can use a myriad variety of remote devices, such as client computers, scanners, digital cameras, smart phones, and other computing and image capture devices, for capturing deposit document images and electronically sending the deposit document image data and other associated data to remote deposit system server. Due the variety of devices, applications, networks, and systems involved in the initiation, processing, and completion of a remote deposit session, complications, conflicts, and other technical issues are sure to arise. Embodiments of the present invention include systems and methods for improved user support and troubleshooting tools to detect, correct, and prevent such issues.

Such embodiments include creating a unique remote deposit session identifier when the remote deposit session is initiated from a remote or local source. All remote deposit session data involved with a particular remote deposit session can be associated with the unique remote deposit session identifier. For example, once the remote deposit session identifier is created, each event, task, or interaction involving the remote user or device, the network, and the server computer used to execute the remote deposit session can be associated with the remote deposit session identifier. Various attributes, such as date and time, software versions, IP address, information about a deposit document image, etc., regarding each event, task, or interaction can be collected and recorded as a single event record. Each event record can then be associated with the unique remote deposit session identifier. In response to a detected error or a user support call or request, a user support user can retrieve and display every remote deposit session event associated with a particular remote deposit session based on the associated remote deposit session identifier. Using various controls and embedded links within the displayed remote deposit session data, a user can explore and interact with attributes for all remote deposit session events, tasks, or interactions from a single user interface. In some embodiments, the user can use the embedded controls in the user interface to directly diagnose and/or correct problems with any of the remote deposit session events, tasks, or interactions. Such embodiments allow for faster and more efficient resolution of detected and user reported problems with remote deposit sessions.

Figure 1B:
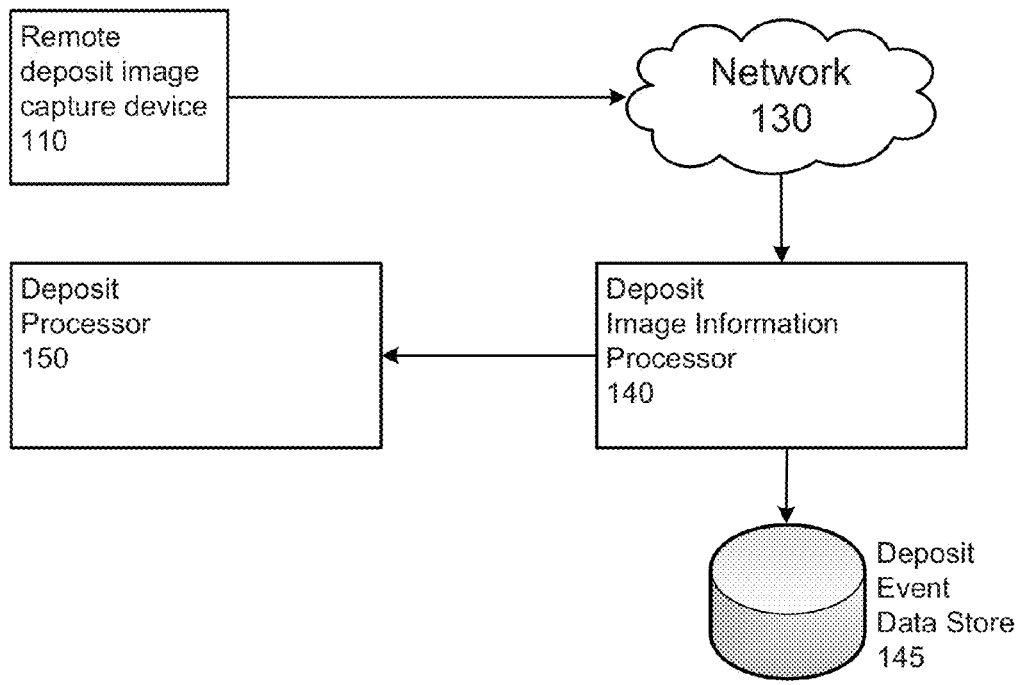

FIGS. 1A and 1B illustrate two simplified schematics of systems 100A and 100B for receiving and processing remote deposits and associated data according to various embodiments of the present invention. System 100A is a system according to various embodiments of the present invention that can be implemented using mobile wireless technologies. System 100B is a system according to other various embodiments of the present invention that can be implemented using various wired and wireless networks.

As shown in FIG. 1A, a remote deposit image capture device 110, such as a smart phone, camera phone, PDA, tablet computer, laptop computer, or other mobile computing device that includes an imaging device, such as a camera or scanner, can be coupled wirelessly via various types of wireless communication protocols to mobile data service 125. For example, remote deposit image capture device 110 can include a smart phone with a built-in camera that is enabled to communicate wirelessly with mobile data service 125. The smartphone can execute an application that is configured to implement various user authentication, image capture, image and data encryption, as well of communication of all such information and data with the mobile data service 125 and other components of systems 110A. Remote deposit image capture device 110 can communicate with mobile data service 125 over various types of data communication standards, such as GPRS, Edge, 3G, 4G, 4G LTE, and other wireless communication standards over one or more electronic wireless communication media.

In some embodiments, the remote deposit image capture device 110 can capture an image of a check, or other deposit document, and send it via one or more wireless communication media through mobile data service 125 and network 130 to deposit image information processor 140. In related embodiments, remote deposit image capture device 110 can capture the image of the deposit document using an application, widget, app, or other such executable code provided by or specific to deposit image information processor 140. In such embodiments, the executable code can include instructions for authenticating an authorized user, i.e. confirming a username and password or pin, or performing various types of biometric authentication, to prevent unauthorized use of remote deposit image capture device 110.

In related embodiments, remote deposit image capture device 110, and or executable code run by the remote deposit image capture device 110, can encrypt, scramble, or otherwise encode remote deposit data sent from remote deposit image capture device 110 to deposit image information processor 140 to secure the data from unintended interception by potential fraudsters. Such remote deposit data can include the raw or processed images of the deposit document as well as user authentication and other user-supplied data.

Deposit image information processor 140, can receive the remote deposit data and/or the user authentication data from remote deposit image capture device 110 by the mobile data service 125, and network 130. In some embodiments, mobile data service 125 can include traditional wireless data service providers and network 130 can include the Internet. In related embodiments, a remote deposit data session can include multiple interactive messages sent between deposit image information processor 140 and remote deposit image capture device 110 via mobile data service 125, and network 130. In such embodiments, deposit image information processor 140 can log each message or interaction as a separate remote deposit event.

Each of the separate remote deposit events can include various information collected in a single entry of a table or other relational database record, i.e. a row. Each record can be associated with a remote deposit data session identifier that is created at the beginning of the particular remote deposit data session. Accordingly, each separate remote deposit event can be associated with the remote deposit data session identifier associated with the remote deposit data session during which it occurs. Deposit image information processor 140 can store, retrieve, and update such remote deposit events associated with the remote deposit data session identifier in deposit information, data store 145.

Deposit image information processor 140 can include a number of functions, modules, or components. In some embodiments, deposit image information processor 140 can analyze and process the images of the deposit documents to extract various information for the deposit processor 150 to execute the transfer of funds from one account to another to complete the intended deposit of funds. Deposit processor 150 can include various types of entities, such as banks, credit card account acquirers, credit unions, brokerage firms, stockbrokers, and any other financial institution that handles or processes financial deposits or other transactions.

As shown in FIG. 1B system 100B is similar to system 100A, but omits the use of mobile data service 125. In such embodiments, remote deposit image capture device 110 can include any type of computing device with an attached or integrated image capture device. For example, remote deposit image capture device 110 can include a personal computer, a thin client, a kiosk, a laptop computer, a tablet computer, a smart phone, or other computing device that includes an image capture device, such as a camera or scanner, as well as network interface capabilities to communicate with deposit image information processor 140 over network 130. In such embodiments, the network interface capability of remote deposit image capture device 110 can include a network interface card or device for communicating over Ethernet, IEEE 802.11 wireless protocols, WiMAX, IP, or any other electronic communication medium, protocol, or standard. Similarly deposit image information processor 140 can include a similar or corresponding network connection or interface module for communicating with the remote deposit image capture device 110, or the mobile data service 125 of system 100A, In each of the exemplary embodiments shown in FIGS. 1A and 1B, the deposit image information processor 140 can include various components or modules for performing specific tasks and functions. The deposit image information processor 140 can be implemented using a combination of hardware, firmware, and software. Accordingly, each of the constituent components or modules of processor 140 can be implemented as a combination of hardware, firmware and software. In one exemplary embodiment of the present invention, deposit image information processor 140 is a software module implemented as computer executable code executed by processor in a server computer connected to one or more networks for communicating with one or more remote deposit image capture devices.

Figure 2:
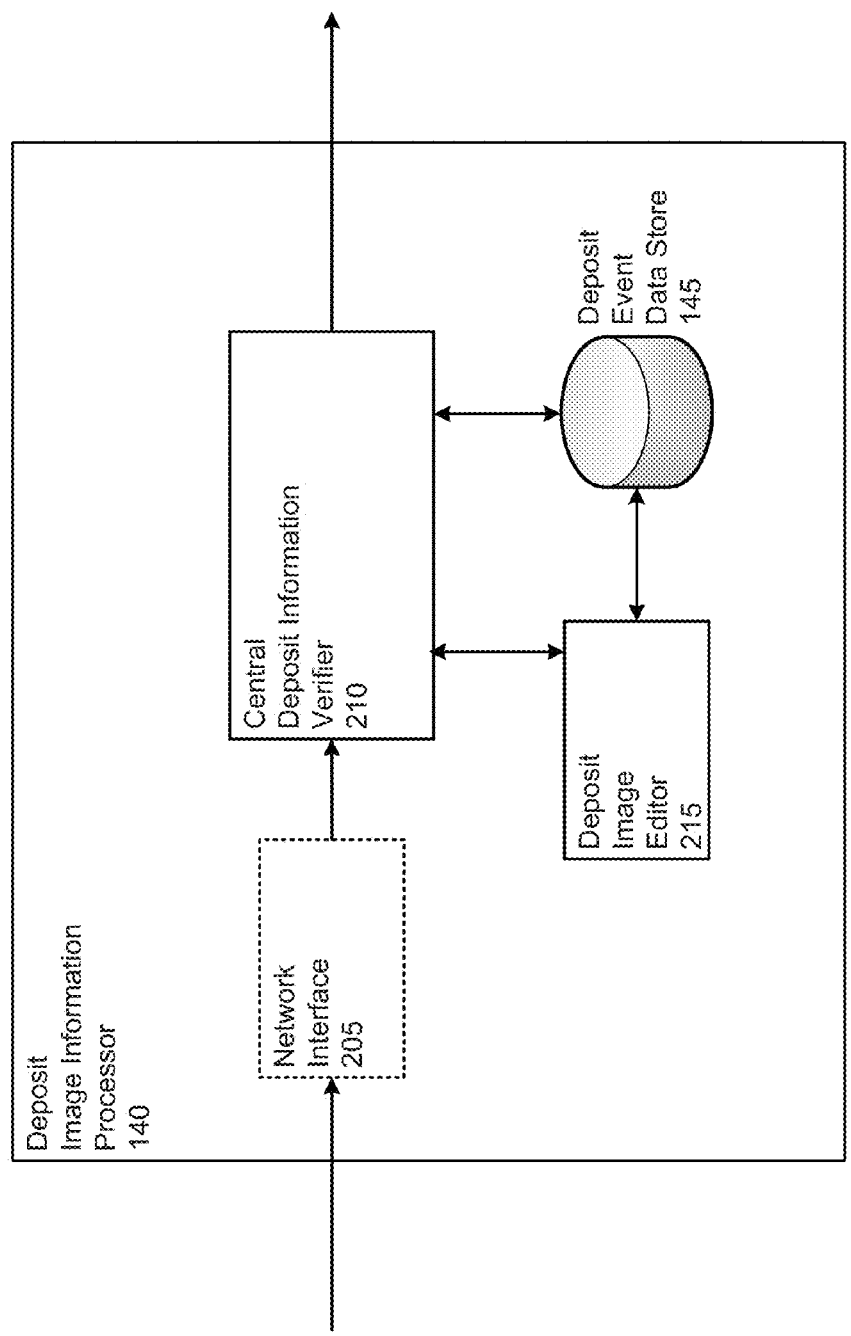
FIG. 2. illustrates a simplified schematic of a deposit image information processor for improved remote deposit support and troubleshooting, according to one embodiment of the present invention.

FIG. 2 shows a simplified schematic of a deposit image information processor 140 according to various embodiments of the present invention. As shown, deposit image information processor 140 can include a network interface 205 coupled to a central deposit data verifier 210, which is coupled to deposit image editor 215 and deposit event data store 145. Each one of the constituent components or modules of the deposit image information processor 140 can be implemented in software, or combination of hardware and software. Accordingly, each of the connections between the connected constituent parts, components or modules can include various types of electronic communication media, including networking communication media, such as Ethernet, and data communication media, such as data bus media.

In exemplary embodiments, deposit image information processor 140 can be connected to one or more networks by a network interface 205. In other embodiments, in which deposit image information processor 140, is one of multiple internal software modules or components, network interface 205 is optional, and therefore can be omitted. In such scenarios, deposit image information processor 140 can exchange information and data with other software components via common internal or external communication protocol inputs and outputs.

In related embodiments, central deposit data verifier 210 can receive remote deposit session data and perform various functions on the remote deposit session data. The remote deposit session data can include multiple interactive messages and actions required for executing a remote deposit. Each message sent or received by the central deposit data verifier 210, and any other intermediate steps or actions performed by the central deposit data verifier 210 or other component of central deposit image information processor 140, during a specific remote deposit session can be logged as an event or data record and associated with a respective remote deposit session identifier. Central deposit data verifier 210 can store the associated remote deposit events in deposit event data store 145. Deposit event data store 145 can include one or more relational or table-based databases.

In various embodiments, the deposit image information processor can receive an remote deposit session initiation message from a remote user or computing device. When the deposit image information processor 140 receives the initiation messages, it can generate a unique remote deposit session identifier. The deposit image information processor 140 can then associate create an event record that includes specific and detailed information regarding the initiation message. Deposit image information processor 140 can also create an individual event record for any and all subsequent electronic message sent to or from the deposit image information processor 140. Deposit image information processor 140 can associate each of such individual records or events with the unique remote deposit session identifier for the particular remote deposit session in which the various communications, tasks, and functions are performed.

Each event record can include various attributes specific to each task, function, or communication represented by the particular event record. The various records or events associated with a particular unique remote deposit session can include any and all functions, tasks, or communications by or between various constituent internal components of deposit image information processor 140 as well as functions, tasks, or communications by or between deposit image information processor 140 and any external components or entities. Deposit image information processor 140, or the central deposit information verifier 210, can save the each one of the records or events in deposit event data store 145. Once a full or partial set of remote deposit session data is stored in the deposit event data store 145, the central deposit information verifier 210, or other components of the remote deposit system, can retrieve the various stored records or events by referencing the particular remote deposit session identifier associated with the particular remote deposit session of interest.

In related embodiments, central deposit data verifier 210 can receive deposit document image data. The deposit image information processor 140 or the central deposit information verifier 210 can create an event record entry for the received deposit document image data and associate it with the unique remote deposit session identifier for the particular remote deposit session during which the deposit document image data was received. For example, the event record can include a row of attributes in a table of a database stored in deposit event data store 145. The row of attributes can include information regarding the deposit document image data, such as image format, image size, resolution of the image, method of image capture, source of the image, information regarding the software and equipment version numbers used to capture/process the image, and the unique remote deposit session identifier, and a timestamp or timecode indicating the time and/or the date image was received. In such embodiments, the deposit document image data can be in various image data file formats, such as JPEG, TIFF, PNG, RAW, GIF, BMP, or any other raster or vector standard or proprietary digital image file format. The central deposit data verifier 210 can analyze and process received deposit document image data. Analyzing and processing the receive deposit document image data can include performing optical character recognition (OCR) on the deposit document image data. Details regarding each step of the analysis and processing performed by the central deposit data verifier 210 can be recorded in a corresponding event record in the deposit event data store 145. Each of such records or events can be associated with unique remote deposit session identifier associated with the remote deposit session during which the steps or tasks were executed.

For example, the central deposit data verifier 210 can perform OCR operations on the digital image of a traditional check. In performing the OCR operations on the digital image of the check, the central deposit data verifier 210 can extract the routing number, the account number, the name of the payee, the name of the payer, the amount of the deposit, an image of the authorized signature from the front of the check, as well as an image of the endorsement stamp or signature from the back of the check and any other information that might be required to authenticate and process the remote deposit and the related transfer of funds. If there are no errors or issues with the extraction of the necessary information from the image of the check, the requisite information can be sent to deposits processor 150 for further processing and/or to execute the deposit represented by the check into the checking account associated with the user or users that initiated the remote deposit data session. Deposit image information processor 140, for the central deposit information verifier 210, can create a record for or event for each of the various steps required for extracting the requisite information and associated with the unique remote deposit session identifier. In some embodiments, the specific information extracted from a particular image of a deposit document can be included as one of the attributes in the record for that particular step in the remote deposit session.

For example, an event record can be created for a particular OCR function performed on the image of a check. In addition to the unique remote deposit session identifier, the record the OCR function can include various attributes regarding the version of the OCR function software, the time started, the time completed, elapsed time, and the various pieces of information extracted from the image, such as account number, routing number, payee's name, and payer's name, etc.

However, in situations in which the deposit document image data is less than optimal, extracting the requisite information from the image of the deposit document can be complicated or otherwise impeded. For example, the image of a check may be out of focus, have low contrast, be too dark or too bright, have low-resolution, be skewed or distorted, or include some other image defect that might prevent the proper analysis and processing of the image of the check to extract the requisite information to complete the remote deposit. In such embodiments, the central deposit data verifier 210 can flag the error and send an error alert to a user, department, or another module of the deposit image information processor 140 for review and/or correction.

In cases of failure of some or all tasks related to extracting information from the deposit document image, the deposit image information processor 140 or the central deposit information verifier 210, can create an event record for each of the attempted but failed tasks. In related embodiments, each individual event record can also include an indication of success or failure. For indications of partial or complete failure, such indications can include descriptions as one or more of the attributes of the event record to help a user diagnose how and why an error occurred or why the process performing the deposit cannot be completed. For example, an indication in one or more the records or events can explain that the resolution of the received deposit document image is too low or that various pieces of information, such as account number or routing number, could not be detected or determined For example, central deposit data verifier 210 can include an alert or error flag in the event record that represents the upload and/or processing of the specific image of a check stored in the deposit event data store 145. The alert or error flag in the deposit event data store 145 can be discovered during a troubleshooting or customer support interaction between a financial institution and a user attempting to make a remote deposit. In such scenarios, the user at the financial institution can log into the deposit image information processor 140 and/or the central deposit data verifier 210 to access the remote deposit data session stored in deposit event data store 145, to view the error or alert flag and the associated information regarding the uploaded check image data. The deposit image editor 215, in accordance with various embodiments of the present invention, can then be invoked.

To invoke the deposit image editor 215, a user can operate a graphical user interface, or other user interface, on the server computer executing the deposit image information processor 140 or a remote client computer connected to the server computer executing the deposit image information processor 140. In some embodiments, the graphical user interface can include a listing of the specific attributes of each event associated with a particular remote deposit data session. In such embodiments, the graphical user interface can include one or more links in one or more deposit event records, such as a hyperlink, operable by a user invoking the deposit image editor 215. The deposit image editor 215 can be invoked during a remote deposit session analysis procedure, or in response to a trouble or issue ticket created by the financial institution or reported by an end-user. Such embodiments are particularly helpful for providing real-time and in-line troubleshooting and user support. A support personnel user can invoke the deposit image editor 215 directly from a remote deposit session record or a specific remote deposit event within a session record.

In some embodiments, the deposit image editor 215 can be invoked to help a customer service representative determine why one of the processes in the remote deposit session encountered an error. For example, the optical character recognition (OCR) or authorized signature determination can fail because the deposit document image provided by the end-user is of insufficient quality, i.e. out of focus, low contrast, distorted, low-resolution, too small, etc. Deposit image editor 215 can be used to manually or automatically detect and/or correct various defects in the deposit document image which can aid in correcting errors in other steps of the remote deposit process.

Deposit image editor 215 can retrieve one or more deposit document images from the deposit event data store 145. The specific deposit document image retrieved from the deposit event data store 145 can be based on a selection made by or determined from a user interaction with a user interface provided by the deposit image information processor 140 or the central deposit data verifier 210. In some embodiments, deposit image editor 215 can instantiate a separate or embedded user interface to provide a user with tools to view, edit, or otherwise manipulate deposit document images from the deposit event data store 145. Each action or task performed by the deposit image editor 215, deposit event data store 145, such deposit information verifier 210, and any other component of deposit image information processor 140, can have an event record created for it and associated with the unique remote deposit session identifier associated with the particular remote deposit session for which the corrective action is taken. In such embodiments, having a complete set of event records associated with a particular unique remote deposit session identifier can help subsequent troubleshooting and/or diagnostic functions.

Figure 3:
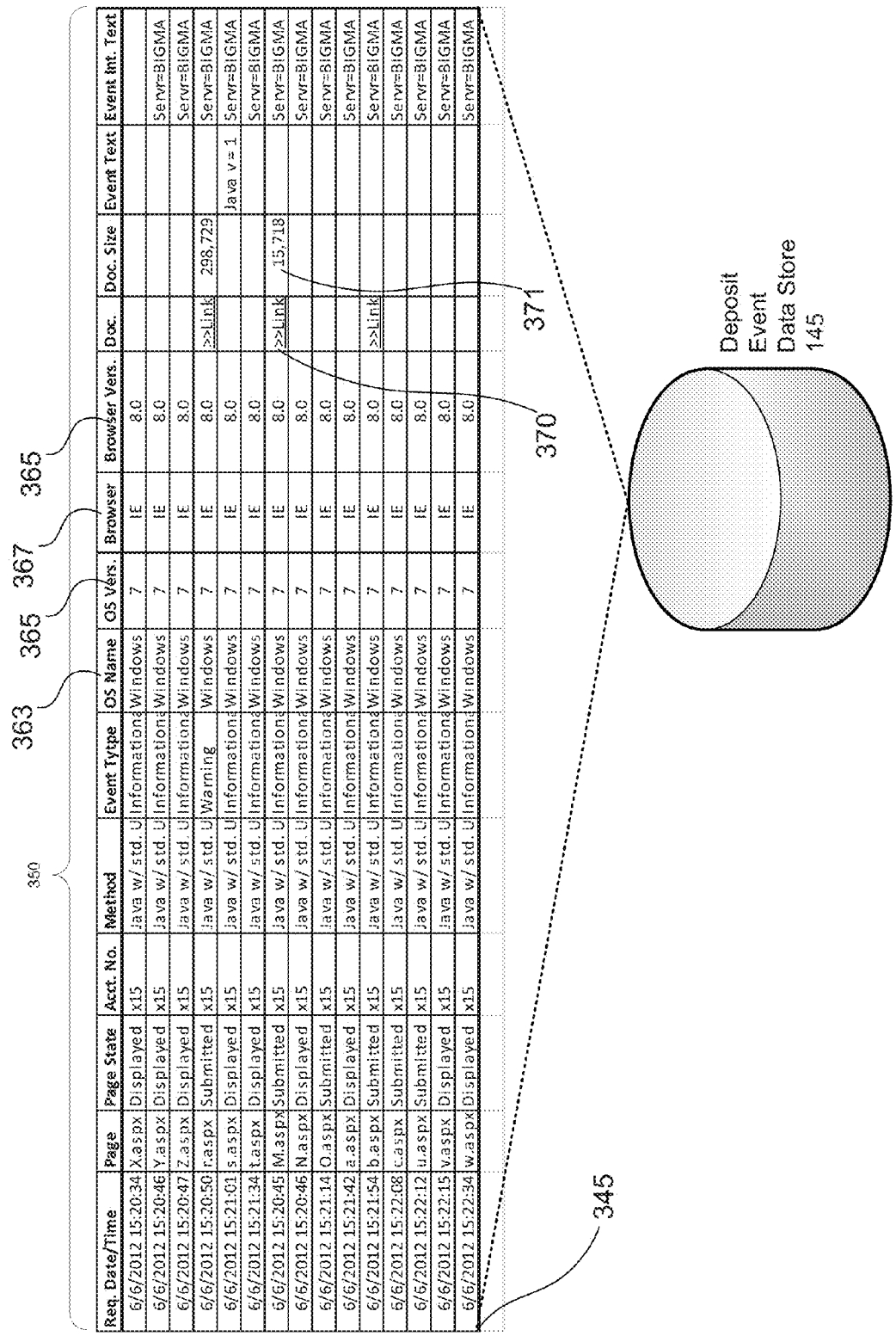
FIG. 3 illustrates a simplified schematic remote deposit session data with attributes and embedded controls for improved remote deposit support and troubleshooting, according to one embodiment of the present invention.

FIG. 3 shows an exemplary table or database entry 345 can be associated with the unique remote deposit session identifier and stored in deposit event data store 145, according to various embodiments of the present invention. As shown in table 345 can include a number of rows and columns. Each row of the table 345 can be associated with or include an attribute indicating the unique remote deposit session identifier during which the event represented by the row occurred. As used herein, each row can represent an event record. Each column of the table can represent a specific attribute or attribute type of each of the event records. For example, table 345 can include columns 350 as shown in FIG. 3. Such columns can include, but are not limited to, descriptions of attributes for the time and date at which a particular event occurred, the specific page or set of instructions that were used to execute the particular event, the page state, the account number, the method of the event or interaction, the event type, the operating system name, the operating system version, a browser identifier, a browser version, placeholders for documents, indication of the document size, the event text, and the event internal text or commands.

While the set of column headers 350 is exemplary, various embodiments of the present invention can include more or fewer event record columns or attributes depending on the complexity of the specific event or task and the permissions of the user who is logged on to retrieve and view table 345. Various other attributes regarding each individual event record can also be included in table 345 depending on the troubleshooting and user support requirements of a particular user, financial institution, or other entity. For example, for an administrator level user, all column headers 350 can be displayed when table 345 associated with a specific unique remote deposit session identifier is retrieved. However, if a limited access level user requests table 345 associated with the same specific unique remote deposit session identifier, some or all of the columns of attributes can be hidden or grayed out. For example, a limited access level user may not have permission to view the column representing account number attributes of each event record.

Each attribute, or column, of each event record can include important information viewable by a user during a user support or troubleshooting session for particular remote deposit data session associated with the unique remote deposit session identifier. As shown in table 345, each event record includes a date and timestamp. In related embodiments, each record event can also include a date and timestamp for the time of completion of the event as well as elapsed time it took to complete the event. Such information is particularly valuable in determining whether or not one or more of the events represented by particular event records was the source of a particular hangup, delay, or failure. For example, if an event takes an inordinate amount of time to complete, it may indicate that there are processing, network, or data issues with respect to that particular event.

In embodiments in which a remote image capture device, such as a smart phone or Web-enabled computer, is used to initiate, conduct, and conclude a remote deposit session with the remote server, that server can send and receive information regarding the remote deposit session in the form of various types of web or network compatible pages. For example, each particular interaction or event between a remote and local computing device can be represented by a specific user interface or set of instructions defined in a particular ASPX or HTML page. In such embodiments, the name of the particular page can be listed as an attribute in each one of the event records. Similarly, a page state indicator can also be associated with each particular event record. As shown in FIG. 3, for each page attribute of each event record, the page state can be listed as a number of different statuses, i.e. displayed or submitted.

Since each remote deposit session can potentially result in the deposit of funds into the account of the user requesting the remote deposit, various embodiments of the present invention list the account number associated with each event record. As discussed above, the specific information or attributes for each event record can be limited based on the level of authentication or authority of a particular user. For example, as shown in FIG. 3, each event record of table 345 includes an abbreviated or truncated version of the account number associated with the particular event record.

While some columns or attributes of a particular event record can be hidden from one or more users or type to users, other information can be required to be included in all tables 345 visible by all users. For example, information regarding potential software and hardware conflict issues can be mandatory and visible by all users. As shown in table 345, each event record can include description of the method of the event, i.e. the type of user interface and version number, a description of the event record type, indication of the operating system, the operating system version identifier, the browser identifier, the browser version identifier, as well as a placeholder for documents, document size, event text, event internal text. Including attributes, such as those represented by columns 363 for the OS name, 365, the OS version 367, the browser indicator 369 for the browser version can all prove to be incredibly valuable in helping a user support technician diagnose or identify specific conflicts between the various types of pages, operating systems, and browsers. Such information can show trends of conflicts or errors can then be logged or later sent to one or more developers to fix.

Also particularly helpful are indications regarding the size of a deposit document image 371. By listing the size of the uploaded, processed, or altered deposit document image, associated with a particular event record, a user support technician or other user can quickly identify potential problems with an associated remote deposit document image based on the magnitude of the size attribute of a particular event record alone. For example as shown document size attribute 371 indicates that the document or file that includes the remote deposit document image accessible by link 370, may be too small or include too little data to be accurately processed.

To confirm that the deposit document image having the document size indicated by indication 371, a user can operate or otherwise select a link 370 to the document saved in the deposit event data store 145 and associated with the unique remote deposit session identifier. In some embodiments, clicking on the link 370 can invoke an image editor according to various embodiments of the present invention. In related embodiments, a user can operate, manipulate, or otherwise interact with the image editor to diagnose, correct, or otherwise edit any errors that might be extant in the received, processed, or saved versions of the remote deposit document image.

In various embodiments, any and all functions and information available in a user interface displaying the information shown in table 345 can be accessed in real or delayed time during a user support or troubleshooting session. Such user support or troubleshooting sessions can be conducted by an end-user, such as an account holder, a financial institution user, such as a bank employee, or a technician at the remote deposit processing center or server operating or handling the remote deposit session. Providing a user support technician with tools to identify, retrieve, access, and correct various event records associated with the particular remote deposit session identifier in real time can greatly increase the speed with which they can make corrections to the particular remote deposit session, thus increasing the efficiency with which remote deposit sessions can be successfully completed while also increasing end-user and financial institution user satisfaction.

FIG. 400 shows an exemplary user interface 400 that can be used to access and manipulate data stored in individual event records associated with a specific unique remote deposit session identifier. As shown, user interface includes a graphical user interface that shows a deposit document image and various attributes associated with that deposit document image. In the specific example shown in user interface 400, the deposit document image includes a black and white, or bi-tonalized, image of a check. In such embodiments, the image of the check can represent a post processed version that has been binarized to reduce the file size of the image for various ISO and financial institution requirements and standards. Along with the image of the check, user interface 400 can also include various fields and sections for displaying different aspects and characteristics and data about or determined from the image of the check. Such fields and sections can be populated with information taken from the attributes of each event record.

User interface 400, can also include a listing of one or more remote deposit sessions 410. The listing can be in table format which includes multiple rows and columns of information regarding various remote deposit sessions. As shown, each of the remote deposit sessions 410 can include a remote deposit session identifier, such as remote deposit session identifiers 421, 423, 425, 427, and 429. Each of the remote deposit sessions 410 and represented by each individual row can include an embedded control such as link 411. When a user selects or operates link 411, a representative image of the deposit document image can be shown in one or more views along with various attributes from one or more event records associated with remote deposit session identifier 429. In other embodiments, when a user selects link 411, a new window or user interface display can be generated showing a table version of some or all event records associated with remote deposit session identifier 429. For example, a table similar to that shown in FIG. 3 can be displayed with various embedded controls and attributes for each event record.

Figure 4:
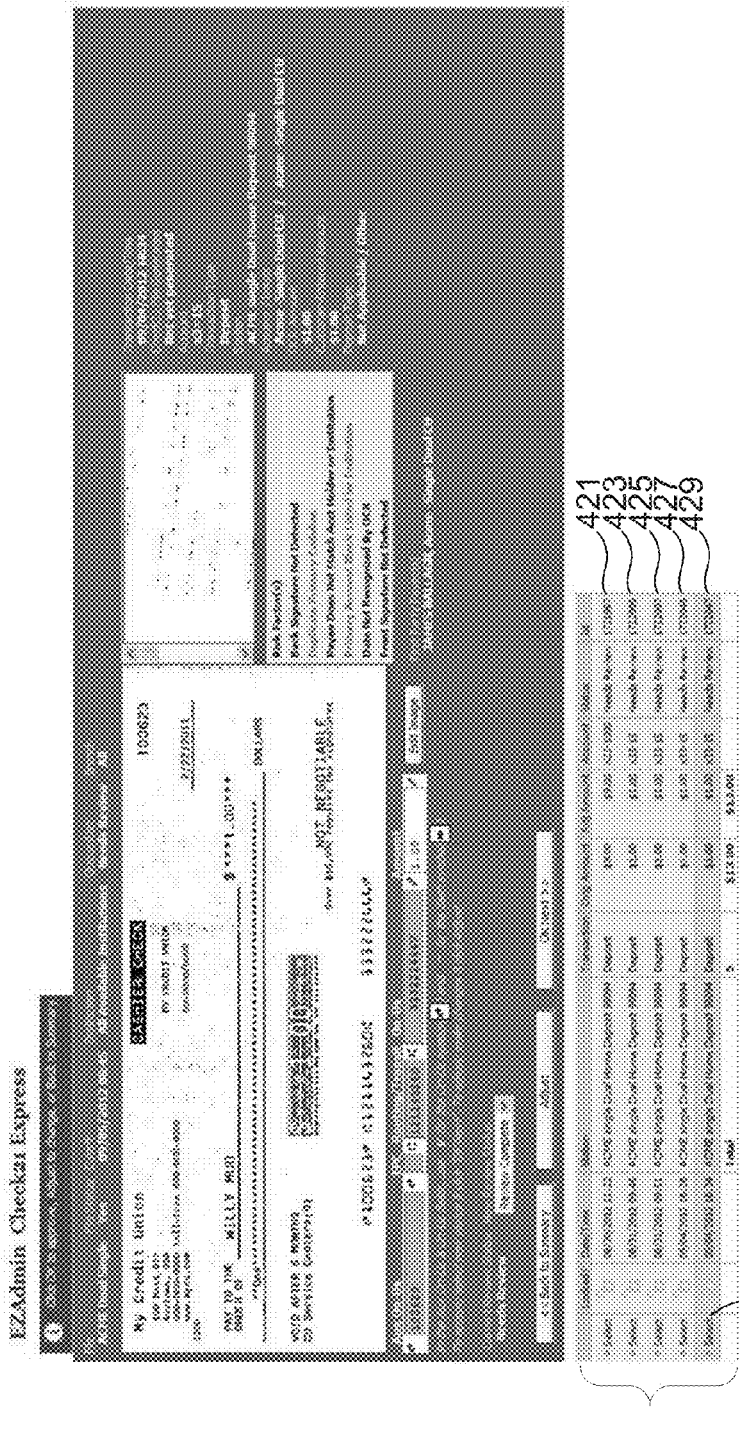
FIG. 4 illustrates a user interface for improved remote deposit support and troubleshooting, according to one embodiment of the present invention.

In various embodiments, user interface 400 can be available to a user support technician when an individual end-user or financial institution user logs into her contacts a central processing center for customer support. User interface 400 includes a specific listing of deposits, as represented by remote deposit sessions 410. Each of the remote deposit sessions 410 represented by the remote deposit session identifiers 421, 423, 405, 427, and 429 can include flags that indicate to a user that such a remote deposit sessions require attention. This is represented in the status column in which the status of the particular remote deposit session can be indicated. In the specific example shown in FIG. 4, all of the remote deposit sessions need review. Also as shown, the listing of remote deposit sessions 410 can be related to one or more different accounts, as indicated by the attribute in the column labeled account. Various other summary information regarding each remote deposit session can also be listed in user interface 400. For example, the date/time, the station designation, the transaction type, the original amount, the adjusted amount, and other information regarding the specific remote deposit session associated with each individual and unique remote deposit session identifier can be listed.

Figure 5:
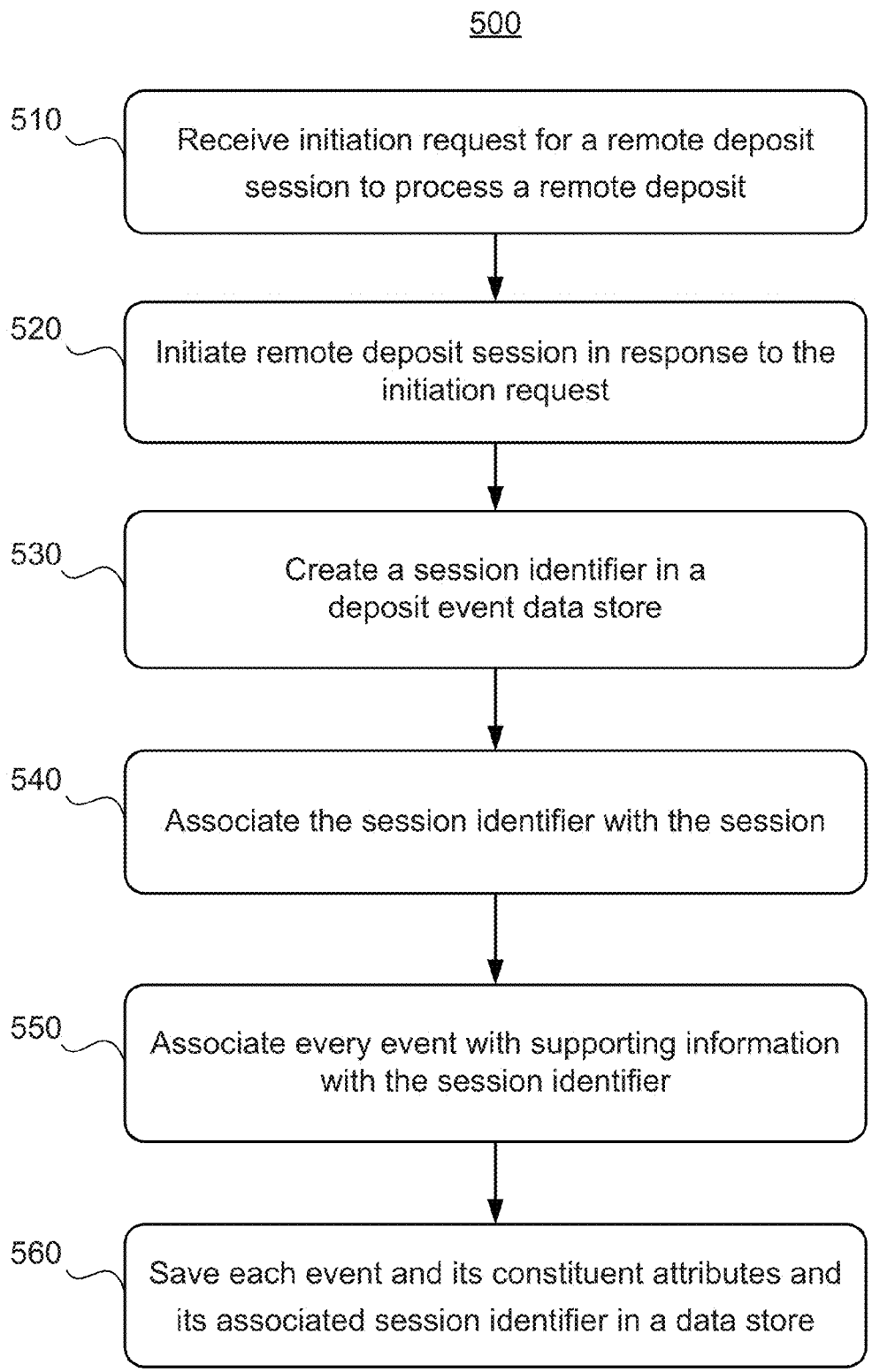
FIG. 5 is a flowchart of a method for improved remote deposit support and troubleshooting, according to one embodiment of the present invention.

FIG. 5 is a flowchart of a method 500 for receiving and logging remote deposit events for a particular remote deposit session. Method 500 begins at action 510, in which a server computer or other computing device executing or implementing various embodiments of the present invention, can receive an initiation requests for remote deposit session to process a remote deposit. As discussed herein, initiation request can be received from a user using a wired or wireless computing device that includes an image capture device. In various embodiments, initiation request can be generated by a standalone or web-based application executed on the remote wired or wireless computing device. In response to the initiation request, the server computer can initiate the remote deposit session in action 520. In some embodiments, once the remote deposit session is initiated, the server computer can create a unique remote deposit session identifier and creates a database data object in a local or remote deposit session event data store, and action 530. In action 540, the computer server can associate the unique remote deposit session identifier with one or more database objects or data structures in the deposit event data store.

Once the server computer has generated the unique remote deposit session identifier and created an associated data structure in the remote deposit event data store, the server computer can associate every subsequent remote deposit session event with the unique remote deposit session identifier in action 550. Finally, in action 560, each event can be represented by an event record associated with the unique remote deposit session identifier and saved, with his constituent attributes, in the remote deposit event data store.

Figure 6:
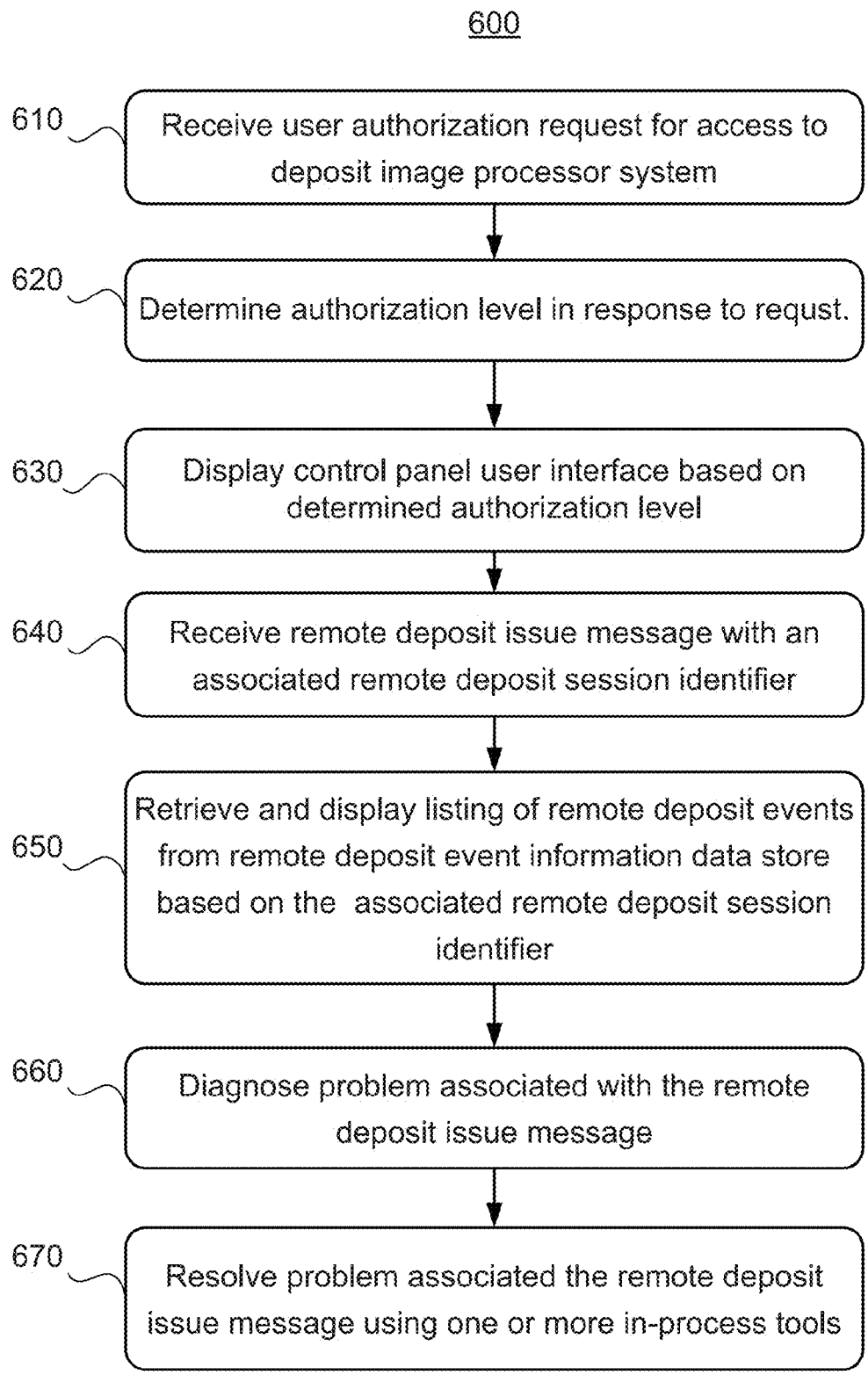
FIG. 6 is a flowchart of a method for improved remote deposit support and troubleshooting, according to one embodiment of the present invention.

FIG. 6 is a flowchart of a method 600 for conducting a user support or troubleshooting session using real-time or in-process remote deposit session data, according to various embodiments of the present invention. Method 600 can begin at action 610, in which a computer server or other entity, such as a deposit image information processor or central deposit information verifier module, can receive a user authorization request for access to the deposit image processor system. In such embodiments, the deposit image processor system can be implemented as a combination of hardware, firmware, and software on a computer server or in a cloud computing environment. The authorization request can be received from an individual end-user, such as a bank account holder, or a financial institution user, such as a bank employee. In other embodiments, authorization request can be received from an employee or agent of the deposit image processor system. Such authorization request can include various types of authentication data, such as username, password, smart card information, as well as biometric information.

In action 620, the image processor system can determine the authorization level of the user in response to the received authorization request and included authentication data. For example, the image processor system can determine the level of authorization based on a particular password and username combination as well as saved roles or associations saved regarding a particular password and username combination. In action 630, the image processor system can display the user interface that includes a control panel based on the determined authorization level. In some embodiments, the user interface can include a listing pre-populated with various remote deposit session identifiers that are associated with specific remote deposit sessions during which one or more errors or complications have been logged. In some embodiments, the image processor system can receive a remote deposit session alert message associated with a specific remote deposit session identifier, in session 640. In such embodiments, the user interface can be updated with real-time information as remote deposit sessions are being conducted.

A user can manipulate or select various embedded controls and links within the user interface to request remote deposit session data associated with a specific remote deposit session identifier. In response to user input received through the various embedded controls and links within the user interface, the image processor system can retrieve and display a listing of remote deposit events from a remote deposit event information and data store based on the associated remote deposit session identifier, in action 650. In some embodiments, the associated remote deposit events can include indications of various issues, alerts, and notations that can guide a user in the diagnosis and correction of various errors and issues with a particular remote deposit event. With all of the information for one or more remote deposit session events displayed in the user interface, a user can manually or use automatic mechanisms within the user interface to diagnose, correct, and edit remote deposit session data, in action 660. Finally, in action 670, a user and/or the image processor system can resolve a problem associated with a particular indication of a particular issue, alert, or notation using one or more internal or external tools connected to the user interface of the image processor system. In related embodiments, the image processor system can then save the edited and or corrected remote deposit session data to the remote deposit event data store. In other embodiments, each action performed by the image processor system to diagnose, correct, or edit, remote deposit session data can also be recorded as a separate remote and associated with the unique remote deposit session identifier for that particular remote deposit session. Such information can also be stored in the remote deposit event data store.

FIG. 7 illustrates an example computer system and networks that may be used to implement embodiments of the present invention. Computer system 710 can include a bus 705 or other communication mechanism for communicating information, and a processor 701 coupled with bus 705 for processing information. Computer system 710 also includes a memory 702 coupled to bus 705 for storing information and instructions to be executed by processor 701, including instructions for performing the techniques described above. This memory may also be used for storing temporary variables or other intermediate information during execution of instructions to be executed by processor 701. Possible implementations of this memory may be, but are not limited to, random access memory (RAM), read only memory (ROM), or both. A storage device 703 is also provided for storing information and instructions. The information instructions can be in the form of computer readable code stored on the storage device, accessible and executable by processor to implement various techniques and methods of the present disclosure. Common forms of storage devices include non-transitory computer readable media, for example, a hard drive, a magnetic disk, an optical disk, a CD, a DVD, a flash memory, a USB memory card, or any other medium from which a computer can read.

Computer system 710 may be coupled via the same or different information bus, such as bus 705, to a display 712, such as a cathode ray tube (CRT) or liquid crystal display (LCD), for displaying information to a computer user. An input device 711 such as a keyboard and/or mouse is coupled to a bus for communicating information and command selections from the user to processor 701. The combination of these components allows the user to communicate with the system.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links, such as IEEE 802.11xx, WiFi, WiMAX, and other wireless electronic communication protocol are other examples. In any such implementation, network interface 704 sends and receives electrical, electromagnetic, or optical signals that carry digital data streams representing various types of information.

Computer system 710 can send and receive information, including messages or other interface actions, through the network interface 704 to an Intranet or the Internet 730. In the Internet example, software components or services may reside on multiple different computer systems 710 or servers 731 across the network. Software components described above may be implemented on one or more servers. A server 731 may transmit messages from one component, through Internet 730, local network 720, and network interface 704 to a component or container on computer system 710, for example. Software components of a composite application may be implemented on the same system as other components, or on a different machine than other software components. This process of sending and receiving information between software components or one or more containers may be applied to communication between computer system 710 and any of the servers 731 to 735 in either direction. It may also be applied to communication between any two servers 731 to 735.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, in a computer system, user input comprising a remote deposit session identifier associated with a particular remote deposit session;
   retrieving, in the computer system, remote deposit session data associated with the remote deposit session identifier from a remote deposit event data store, wherein the remote deposit session data comprises a plurality of remote deposit event records having a first remote deposit event record created first in time before the other remote deposit event records; and
   displaying, on a display device of the computer system, the remote deposit event records, wherein each remote deposit event record corresponds to a particular event of the remote deposit session and comprises a plurality of attributes associated with the particular event;
   wherein the remote deposit session identifier comprises an identifier created before the first remote deposit event record.

2. The method of claim 1 wherein receiving user input occurs during a user support or troubleshooting session already in progress.

3. The method of claim 1 wherein the remote deposit session comprises a remote check deposit transaction using an image of a check.

4. The method of claim 1 wherein each of the plurality of remote deposit event records is associated with a time identifier.

5. The method of claim 4 wherein the time identifier comprises a duration corresponding to a difference between a start time and an end time of a particular remote deposit event.

6. The method of claim 1 wherein at least one of the attributes comprises an embedded control.

7. The method of claim 6 wherein the embedded control comprises a link to a deposit document viewer.

8. A system comprising:
   a deposit image information processor; and
   a network interface coupled to the deposit image information processor and an external network and a deposit processor;
   wherein the deposit image information processor receives user input comprising a remote deposit session identifier associated with a particular remote deposit session, retrieves, through the network interface, remote deposit session data associated with the remote deposit session identifier from a remote deposit event data store, each said remote deposit session data comprises a plurality of remote deposit event records having a first remote deposit event record created first in time before the other remote deposit event records, and displays the remote deposit event records, each said remote deposit event record corresponds to a particular event of the remote deposit session and comprises a plurality of attributes associated with the particular event;
   wherein the remote deposit session identifier comprises an identifier created before the first remote deposit event record.

9. The system of claim 8 wherein the deposit image information processor receives user input during a user support or troubleshooting session already in progress.

10. The system of claim 8 wherein the remote deposit session comprises a remote check deposit transaction using an image of a check.

11. The system of claim 8 wherein each of the plurality of remote deposit event records is associated with a time identifier.

12. The system of claim 11 wherein the time identifier comprises a duration corresponding to a difference between a start time and an end time of a particular remote deposit event.

13. The system of claim 8 wherein at least one of the attributes comprises an embedded control.

14. The system of claim 13 wherein the embedded control comprises a link to a deposit document viewer.

15. A non-transitory storage medium comprising:
   executable code comprising instructions that when executed causes a processor to receive user input comprising a remote deposit session identifier associated with a particular remote deposit session, retrieve, through a network interface, remote deposit session data associated with the remote deposit session identifier from a remote deposit event data store, each said remote deposit session data comprises a plurality of remote deposit event records having a first remote deposit event record created first in time before the other remote deposit event records, and display the remote deposit event records, each said remote deposit record corresponds to a particular event of the remote deposit session and comprises a plurality of attributes associated with the particular event, and
   wherein the remote deposit session identifier comprises an identifier created before the first remote deposit event record.

16. The non-transitory storage medium of claim 15 wherein the executable code further comprises instructions that cause the processor to receive user input during a user support or troubleshooting session already in progress.

17. The non-transitory storage medium of claim 15 wherein the remote deposit session comprises a remote check deposit transaction using an image of a check.

18. The non-transitory storage medium of claim 15 wherein each of the plurality of remote deposit event records is associated with a time identifier.

19. The non-transitory storage medium of claim 18 wherein the time identifier comprises a duration corresponding to a difference between a start time and an end time of a particular remote deposit event.

20. The non-transitory storage medium of claim 15 wherein at least one of the attributes comprises an embedded control.

* * * * *